(12) United States Patent
Jung

(10) Patent No.: US 8,287,391 B2
(45) Date of Patent: Oct. 16, 2012

(54) TORSIONAL VIBRATION DAMPER

(75) Inventor: Stefan Jung, Kehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/050,477

(22) Filed: Mar. 17, 2011

(65) Prior Publication Data

US 2011/0165949 A1    Jul. 7, 2011

Related U.S. Application Data

(63) Continuation of application No. PCT/DE2009/001235, filed on Sep. 3, 2009.

(30) Foreign Application Priority Data

Sep. 22, 2008  (DE) .................... 10 2008 048 268

(51) Int. Cl.
    *F16F 15/123* (2006.01)
(52) U.S. Cl. ...................................... 464/68.9; 464/67.1
(58) Field of Classification Search .................. 464/67.1, 464/68.9, 68.91, 69.92, 68.921; 192/203
    See application file for complete search history.

(56) References Cited

U.S. PATENT DOCUMENTS

| 4,451,244 A | * | 5/1984 | Lamarche ................... 464/67.1 |
| 4,944,712 A | * | 7/1990 | Worner et al. |
| 5,562,542 A |   | 10/1996 | Rohrle |

FOREIGN PATENT DOCUMENTS

| DE | 3721711 | 1/1988 |
| DE | 4341373 | 6/1994 |
| DE | 10241879 | 4/2003 |
| EP | 1621796 | 2/2006 |
| FR | 2653513 | 4/1991 |
| WO | 9106785 | 5/1991 |

* cited by examiner

*Primary Examiner* — Gregory Binda
(74) *Attorney, Agent, or Firm* — Simpson & Simpson, PLLC

(57) ABSTRACT

A torsional vibration damper, comprising at least two components which can be rotated counter to the resistance of at least one helical spring or bow spring precurved toward the rotational axis for compression of the at least one bow spring during a relative rotation among the components. The at least one bow spring is provided with support in the circumferential direction across the outside diameter thereof on a sliding shell. In order to reduce friction, the outside diameter of the at least one bow spring has a distance from the inside diameter of the sliding shell.

9 Claims, 5 Drawing Sheets

TORSIONAL VIBRATION DAMPER

CROSS-REFERENCE TO RELATED APPLICATIONS

This application is filed under 35 U.S.C. §120 and §365(c) as a continuation of International Patent Application PCT/DE2009/001235, filed Sep. 3, 2009, which application claims priority from German Patent Application No. 10 2008 048268.4, filed Sep. 22, 2008, which applications are incorporated herein by reference in their entireties.

FIELD OF THE INVENTION

The invention relates to a torsional vibration damper with at least two components that are rotatable against the resistance of at least a coil spring and/or an arc spring precurved towards the axis of rotation, at whose ends compression sections are provided for the compression of at least one arc spring during relative rotation between both components, whereby at least one arc spring in circumferential direction is supported over its outer diameter on a guide shell.

BACKGROUND OF THE INVENTION

DE-OS 37 21 711, FR-OS 2 653 513 and WO 91/06785 teach respective torsional vibration dampers used preferably for damping vibrations in the drive train of a vehicle between the engine and torque transmission device. Through the application of springs featuring a precurved form, coil compression springs can be assembled advantageously in a simple manner prior to installation, with a large length-diameter ratio. Moreover, in operation condition while the springs are at least compressed partially with their outer diameter on correspondingly assigned guide shells, favorable material stress occurs in this area of the spring. However, this spring's contact on the guide shells also causes friction. If the spring is compressed through angular momentum, single turns of the spring are pushed along the respective guide shell until they adjoin one another at least over a section. Depending upon the action of centrifugal forces, friction will be very high from a certain value based on the rotational speed, so that the turns no longer move relatively to the guide shell and hence the springy function decreases. Therefore, the ratio of static to dynamic spring rate increases with the increase of rotational speed of the torsional vibration damper. That means that the proportion of the dynamic spring rate decreases.

BRIEF SUMMARY OF THE INVENTION

The object of the invention is therefore to create a torsional vibration damper with an improved dynamic spring rate.

The object is met by means of a torsional vibration damper with at least two components rotatable against the resistance of at least a coil spring and/or an arc spring precurved towards the axis of rotation, at whose ends compression sections are provided for the compression of at least one arc spring during a relative rotation between both components. Thereby, at least one arc spring is provided with a support over its outer diameter on a guide shell in the circumferential direction. In accordance with the invention, the outer diameter of at least one arc spring has a distance from the inner diameter of the guide shell. The friction between guide shell and arc spring is reduced through this distance.

In an advantageous improvement of the invention, the rotatable component is formed as a flange that is rotatable around the axis.

Moreover, it is advantageous that the flange comprises several arms disposed over its circumference, oriented radially outwards. Furthermore, it is advantageous that every cross arm is formed at the end such that it surrounds the outer diameter of the arc spring in a shell-shaped manner.

It is advantageous that the difference between the inner diameter of the cross arm and the outer diameter of the arc spring corresponds to a distance.

An advantageous embodiment of the invention provides that the rotatable components be formed as an arc spring guide and/or flywheel elements.

It is advantageous moreover, that the rotatable components are provided with several arc spring supports distributed over the circumference.

In an advantageous embodiment of the invention, the inner diameter surrounds at least one of the rotatable components, the outer diameter of at least one arc spring in a shell-shaped manner. Thereby, it is advantageous that a distance remains between the inner diameter of one rotatable component and the outer diameter of an arc spring.

BRIEF DESCRIPTION OF THE SEVERAL VIEWS OF THE DRAWINGS

The invention is illustrated in detail based on an exemplary embodiment with accompanying drawings as follows.

Figure 1:
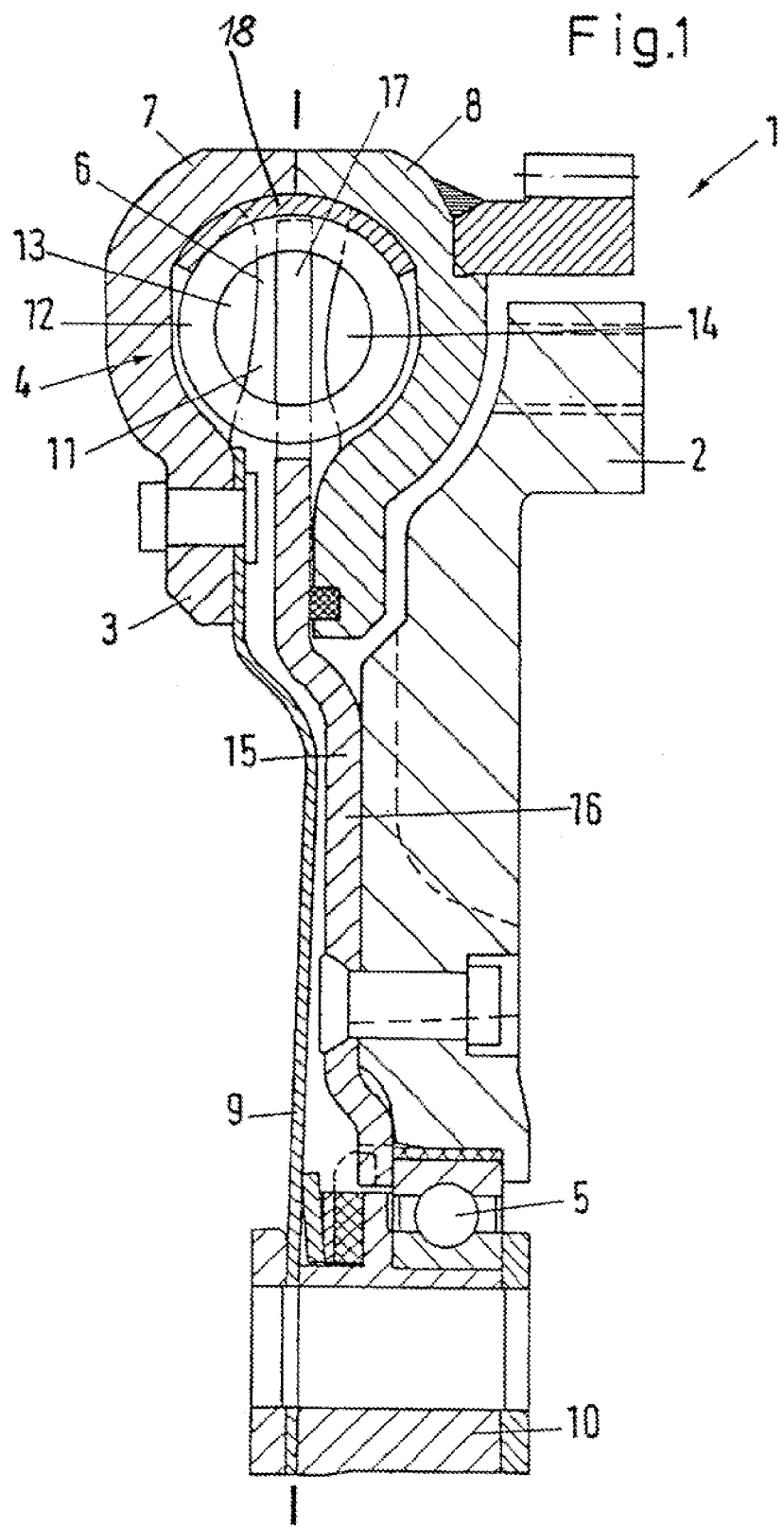
FIG. 1 is a partial section of a torsional vibration damper in the form of a dual massflywheel.

A damping device containing energy accumulator in accordance with the invention can for instance find application in a torsional vibration damper in the form of a so-called dual mass flywheel. Therefore, its design is described in detail based on a dual mass flywheel 1 in FIG. 1. The dual mass flywheel 1 consists of two components, rotatable around an axis of rotation—not represented—that consists essentially of the flywheel elements 2 and 3. The flywheel element 3 is also designated as a primary mass that can be connected with the driveshaft of an engine—not represented in detail—for example via a screw connection. With the flywheel element 2 and/or also designated as a secondary mass, a torque transmission device with shifting capability is connectable, through which this flywheel element 2 can be coupled to and decoupled from the input shaft of a transmission. A damping device 4 is disposed between flywheel elements 2 and 3, which facilitates relative rotation between the flywheel elements 2 and 3. Both flywheel elements 2 and 3 are rotatable relatively to each other via a roller bearing 5.

The flywheel element 3 forms a housing that limits a ring-shaped chamber 6 in which the damping device 4 is accommodated. Ring-shaped chamber 6 consists essentially of two shell-shaped housing parts 7, 8 that are interconnected radially outside, for example, by welding. The housing side 7 turned towards the engine is connected radially inside via rivet connections with a torque transmission plate 9, on which an axial extension 10 is provided radially inside. The roller bearing 5 is accommodated on this axial extension 10, which carries the flywheel element 2 over its external bearing ring.

The shell-shaped housing parts 7, 8 form a ring channel like and/or torus like receptacle 11 radially outside, which when observed in circumferential direction of the torsional vibration damper 1, is subdivided into single ring-arc-shaped and/or sector-shaped receptacles in which springs, for example, arc springs, are received. The housing parts 7 and 8 possess compression sections 13, 14 formed by axial embossed surfaces and/or pockets of housing parts 7, 8. Through these compression sections 13, 14, the sector-shaped receptacles are limited in circumferential direction for arc springs 12. The output part of damper 4 is formed through flange-like component 15 that extends axially between housing parts 7 and 8. Flange-like component 15 is fixed radially inside with flywheel element 2, for examle, by means of rivet connections. Component 15 has a base body 16 that comprises cross arms 17 radially outwardson its outside circumference. The cross arms 17 extend, viewed in circumferential direction, between neighboring arc springs 12. For unloaded torsional vibration damper 1, the cross arms 17 are located axially between the compression sections 13, 14 of the housing parts 7, 8, respectively assigned them.

At least the radial cross arms 17 of the flange 15 engage into the ring-shaped chambers 6. The flange 15 can be fastened with radial internal areas, for example, by means of rivet connections on a driven flywheel element 2.

The arc springs 12 acting between both flywheel elements 2 and 3 are already bent prior to the installation and/or prior to insertion into the sector-shaped receptacles 11 of the flywheel element 3, in the relaxed state. Therefore, the springs possess an arc-shape that corresponds at least approximately to the shape of the torus-shaped receptacle 11.

The drive-side flywheel element 3 possesses flange 15 in the interior, which, on its radial internal area, carries and/or comprises a sleeve-shaped axial extension 10, on which a driven side flywheel 2 can be supported rotatably. In an advantageous manner, as depicted in FIG. 1, the bearing required for this can be formed by a roller bearing 5. To fasten the drive flange 15 on the drive shaft of an engine, screw openings are provided in the drive flange 15, radially outside the extension 10, and therefore also outside the radial bearing between both flywheel elements 2 and 3.

The radial drive flange 15 and a shell-shaped housing part 8 limit the ring-shaped room 6 that can advantageously be at least partially filled with a viscous medium, for example, grease. In the ring-shaped room 6, damping device 4 containing an energy accumulator is disposed.

The axial extension 10 carries the torque transmission plate 9, which is connected with the flywheel element 3 formed as shell-shaped housing part 7.

The driven-side transmission element 2 and/or the flywheel element is connectable in a known manner by means of a friction clutch—not depicted in detail—by which the clutch plate is mountable on a transmission input shaft, connectable with a transmission.

Figure 2:
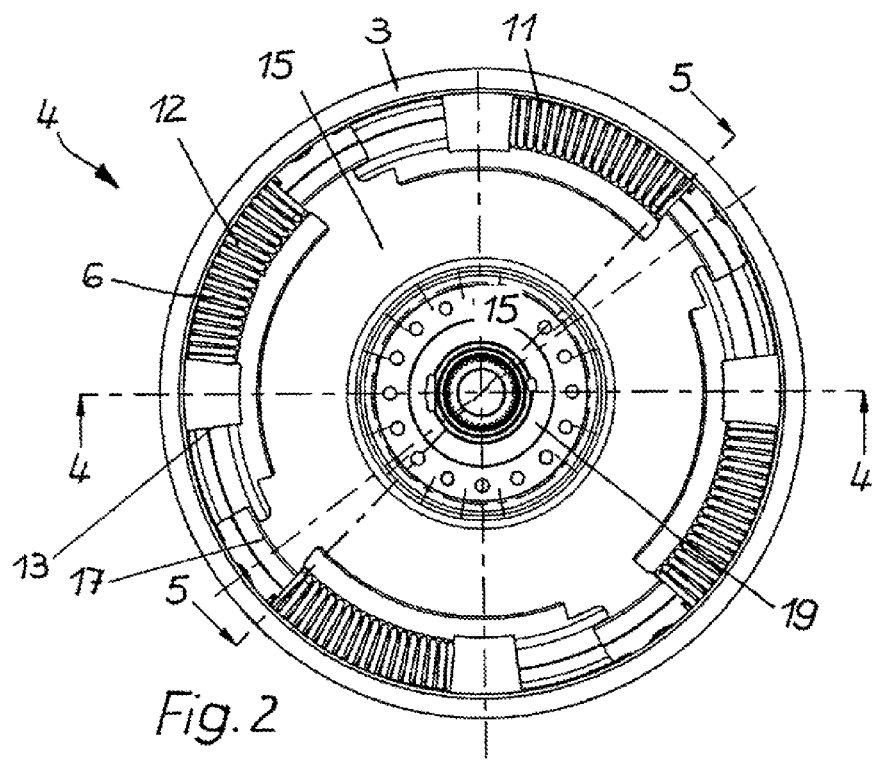
FIG. 2 is a plan view of the damping device of a torsional vibration damper containing energy accumulators.

In FIG. 2, the damping device 4 of torsional vibration damper 1 is visible. For simplification, the reference signs from FIG. 1 are retained for parts with the same function for the description of the following FIGS. 3 to 6. FIG. 2 shows the angular position of different components of the damping device 4 in the unloaded state, i.e. several energy accumulators formed by coil compression and/or arc springs 12.

Therefore, essential components of the damping device 4, like the flywheel element and/or the primary mass 3 in the form of a shell-shaped plate as well as a guide shell 18 are visible, in whose inner diameter the arc springs 12 are disposed, which are supported on the primary mass 3 in axial direction. The arc springs 12 lie at the same time in segment areas and/or receptacles 11 of the primary mass 3 and are spaced apart in a circumferential manner by means of several embossed compression sections 13, which fix the arc springs 12 in circumferential direction. In the exemplary embodiment represented in FIG. 2, four energy accumulators are provided, which are preferably respectively spaced at an angle 90° to each other. The number of compression sections 13 corresponds at the same time with the number of arc springs 12. It should be understood that other numbers of energy accumulators and compression sections are possible.

Between compression sections 13 of the primary mass 3, as already mentioned in FIG. 1, the ring-shaped chambers 6 for supporting the arc springs 12 are located. The chambers 6 are filled with grease for the reduction of friction of the turns of the arc springs to each other, what positively affects noise damping of the damping device 4 and has positive effect on the torsional vibration damper. In the resting state of the damping device 4 represented in FIG. 2, the cross arm 17, that like the arc springs 12 are also arc-shaped, are located axially between the compression sections 13, which are embossed in housing parts 7 and 8. The compression sections 14 embossed in the secondary mass, which are not visible in this representation, also have an arc-shaped formation. In the center, the primary mass 3 is provided with a hub 19, which has a hub-profile on its inner circumference. In FIG. 2, the flange 15 comprises four cross arms 17 that respectively lie at an end winding of the respective arc spring 12 and/or extend with its protrusion in its inner space in order to guide the arc spring 12 in circumferential direction. In the operation state of the torsional vibration damper, the components of the damping device 4 are set in rotary motion. Thereby, the torque is transmitted from the drive to the primary flywheel 3, which again transmits the torque by means of its compression sections 13 to the arc springs 12. Via the cross arms 17 of the flange 15 in connection with the "free" end turns of the arc springs 12, the torque is transmitted further into a second flywheel element and/or a secondary mass, whereby the arc springs 12 are compressed in circumferential direction. At the same time, the relative rotation between primary mass and secondary mass and/or between a driven flywheel element and the drive-side flywheel element 3 is limited. The rotation angle can be limited also when the turns of the spring go solid.

Figure 3:
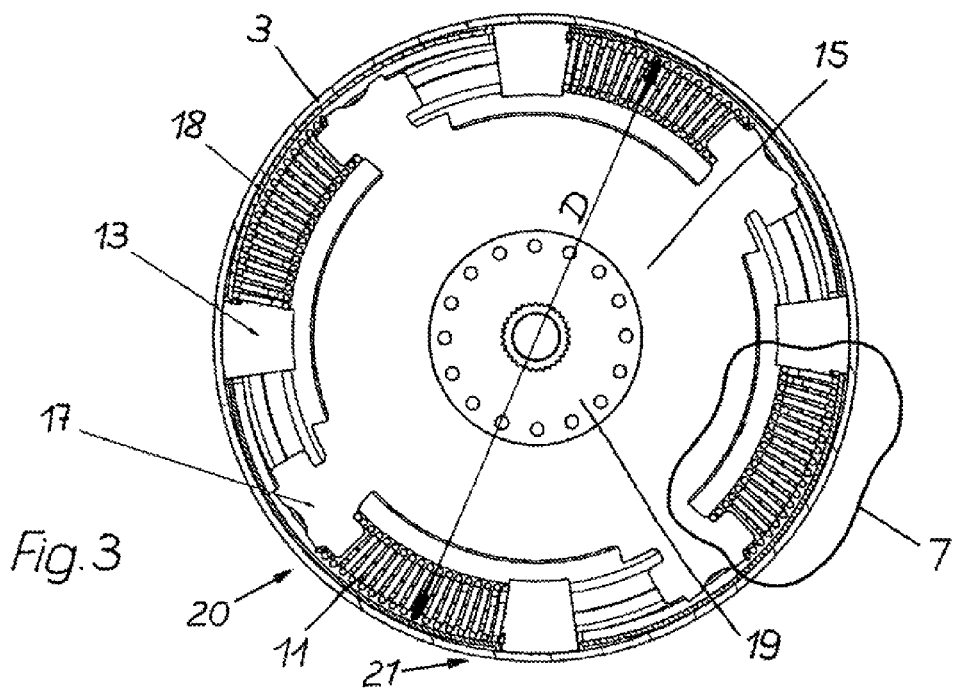
FIG. 3 is a representation of the damping device according to the sections 3-3 of FIG. 5.

FIG. 3 shows the damping device 4 in accordance with FIG. 2, in that the section 3-3 extends through the flange 15 and the hub 19 connected with the latter, in order to highlighten the cross arm 17 extending radially outwards from said hub. From this figure, the engagement of the cross arm 17 into the free end turns of the arc springs 12 is particularly visible. Laterally formed noses for the cross arms dip into the end turns of the arc springs 12 and lead in this area on the same radius. Otherwise, the arc springs 12 lie in their receptacles 11, whereby, with their other end turns, they lie on the compression sections 13 (and/or 14 not represented), which simultaneously function as arc spring supports. From this figure, it follows that the guide shell 18, with its outer diameter, lies on the inner diameter of the primary mass 3 and is spaced from the outer diameter D of the arc springs 12, so that a distance X is formed between both components (see also FIG. 6). Upon introduction of rotary motion into the arc springs 12, to drive the other rotatable component—not represented—and/or the secondary mass by means of the cross arm 17 provided on the flange, single turns of the arc spring are compressed, whereby the arc spring approaches the inner diameter of the guide shell 18 with outer diameter D. To prevent both diameters from contact at end 20 of the arc spring, and thus avoid friction between both components, the distance X must be selected such that contact is avoided between both components. End 21 of the arc spring is in contact with the inner diameter of the guide shell 18.

Figure 4:
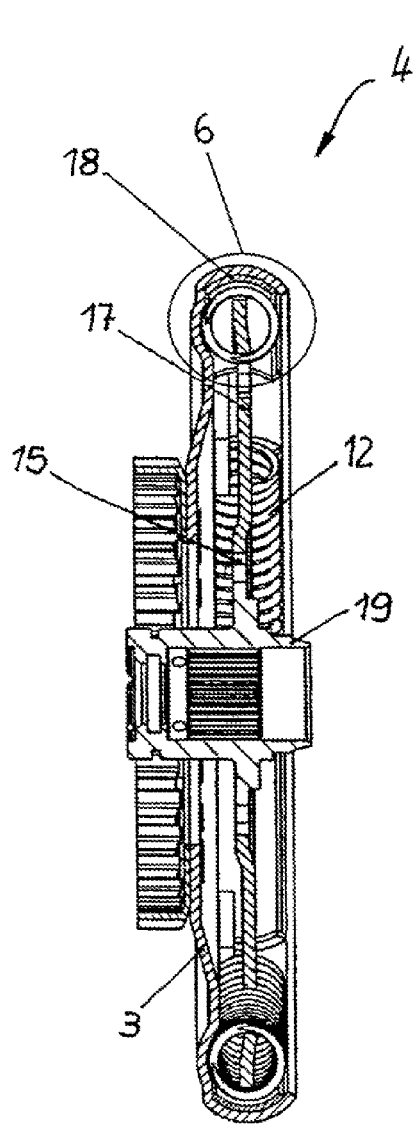
FIG. 4 is a section 4-4 through the damping device according to FIG. 2.
Figure 5:
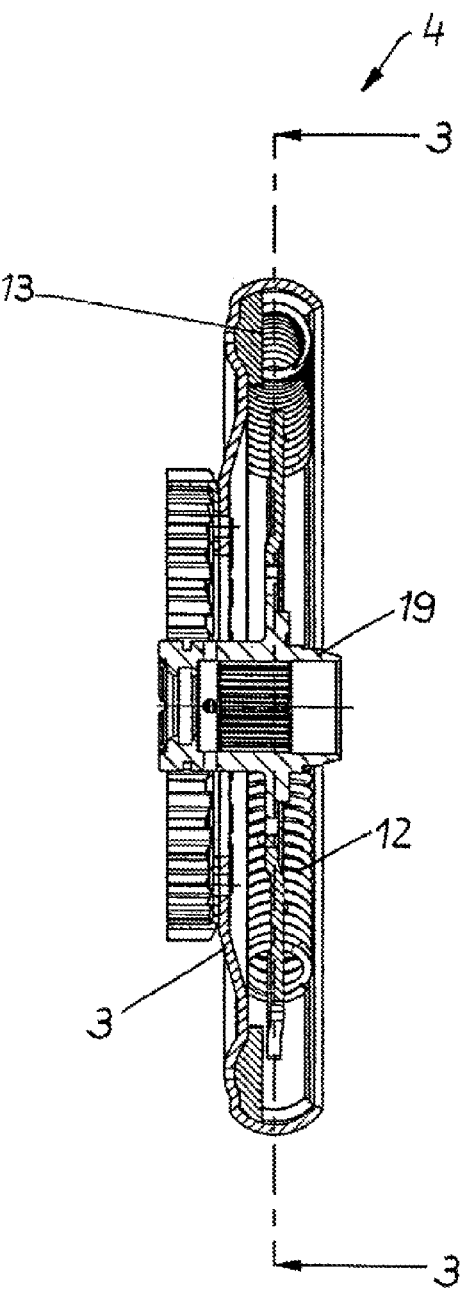
FIG. 5 is a section 5-5 through the damping device in accordance with FIG. 2.

In FIG. 4, the damping device 4 is represented in section 4-4 from FIG. 2. From here, the flywheel element 3 as well as the hub 19 fixedly connected with the flange 15 is visible; just as the cross arm 17 of the flange 15 and the arc springs 12 whose outer diameter D is spaced towards the inner diameter d of the guide shell 18. Through section 5-5 in accordance with FIG. 2, through the damping device 4, besides the components already cited in FIG. 4, the arc spring support 13 is visible in FIG. 5.

Figure 6:
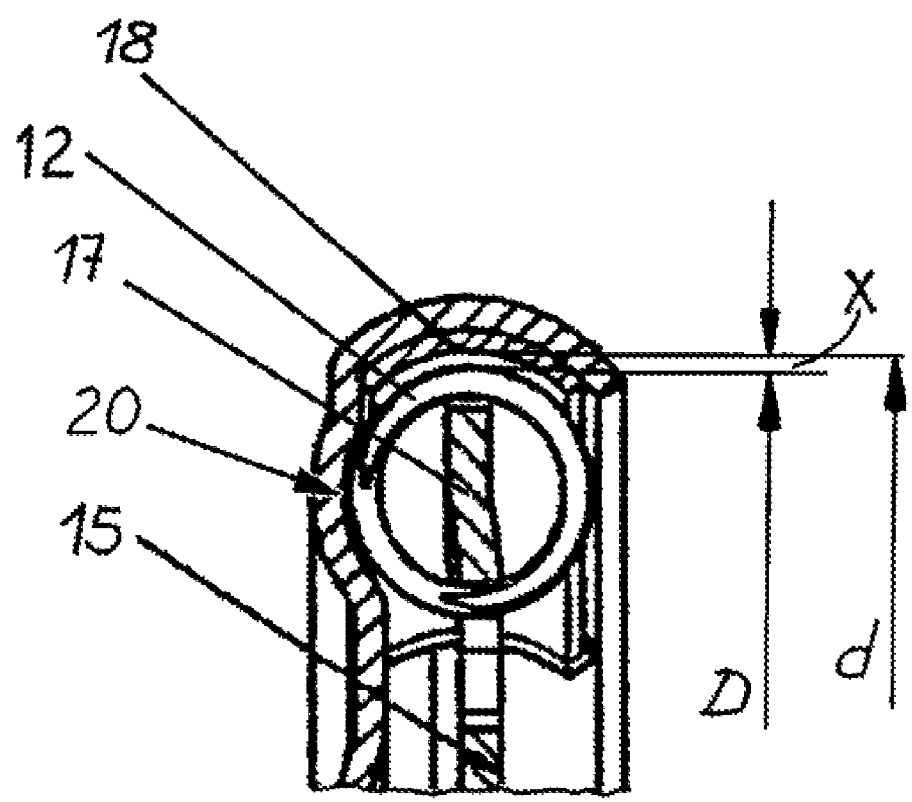
FIG. 6 is a magnification of area 6 in FIG. 4.

By way of illustration of the distance X between the outer diameter D of the arc spring 12 and the inner diameter d of the guide shell 18, this section is represented in FIG. 6 from FIG. 4 in a magnified scale. Moreover, the flange 15 engaging between the turns of arc spring 12 with its cross arm 17 are visible. Through this distance X, friction is reduced respectively between the arc spring 12 and guide shell 18.

Figure 7:
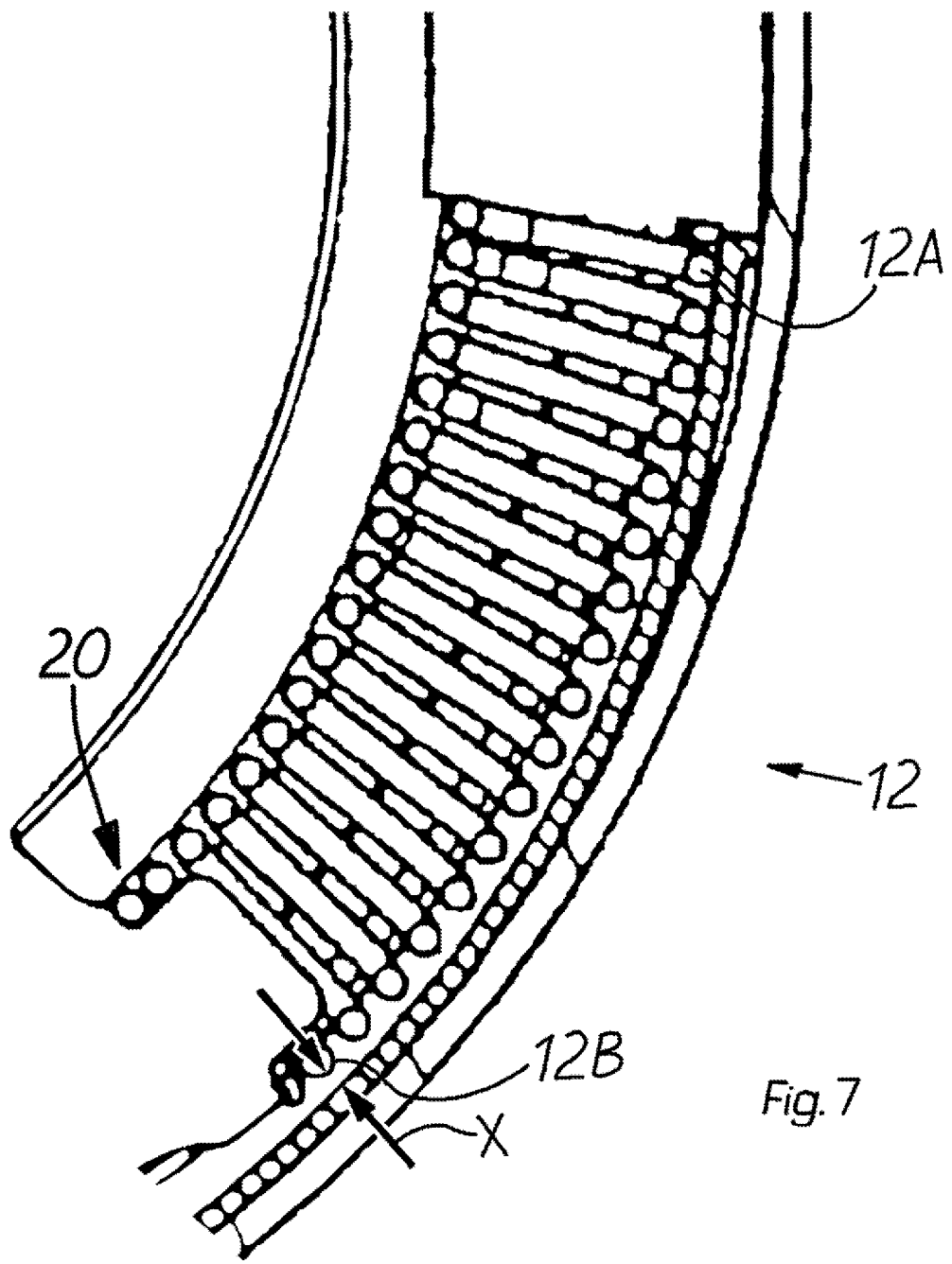
FIG. 7 is a magnification of area 7 in FIG. 3.

FIG. 7 is a magnification of area 7 in FIG. 3. In FIG. 7, end 12A of spring 12 is in contact with guide shell 18 and end 12B of spring 12 is separated by guide shell 18 by distance X.

List of Reference Symbols
1 dual mass flywheel/torsional vibration damper
2 flywheel element/secondary mass/arc spring guide
3 flywheel element/primary mass/arc spring guide
4 damping device
5 bearing/roller bearing
6 ring-shaped chamber
7 shell-shaped housing part
8 shell-shaped housing part
9 torque transmission plate
10 extension
11 receptacle
12 coil spring/arc spring
13 compression section/arc spring support
14 compression section/arc spring support
15 flange type component/flange
16 base body
17 cross arm
18 guide shell
19 hub
D outer diameter of arc spring
d inner diameter of guide shell

What we claim is:

1. A torsional vibration damper, comprising:
at least one coil spring or arc spring precurved towards an axis of rotation for the vibration damper;
a guide shell; and,
at least two components rotatable against resistance of the at least one coil spring or arc spring and including respective compression sections for the compression of said at least one coil spring or arc spring during relative rotation between the at least two components, wherein:
a radially outward portion of a first end of the at least one coil spring or arc spring, is in contact with the guide shell; and,
a radially outward portion of a second end of said at least one coil spring or arc spring is separated, in a radial direction, by a distance from said guide shell.

2. The torsional vibration damper according to claim 1 wherein a component from the at least two components is formed as a flange that is rotatable around the axis of rotation.

3. The torsional vibration damper according to claim 2, wherein the flange comprises a plurality of cross arms distributed over a circumference of the flange and aligned radially outwards.

4. The torsional vibration damper according to claim 1 wherein at least one component from the at least two components is formed as an arc spring guide and flywheel element.

5. The torsional vibration damper according to claim 4 wherein the at least one component is provided with a plurality of arc spring supports distributed over a circumference of the at least one component.

6. The torsional vibration damper according to claim 1 wherein at least one component from the at least two components is formed as an arc spring guide or flywheel element.

7. The torsional vibration damper according to claim 6 wherein the at least one component is provided with a plurality of arc spring supports distributed over a circumference of the at least one component.

8. A torsional vibration damper, comprising:
a guide shell with a smooth curved shape in a cross-section taken along a line orthogonal to an axis of rotation for the torsional vibration damper;
an input component;
at least one spring with:
a first end engaged with the input component and in contact with the guide shell; and,
a second end wholly separated from the guide shell in a radial direction; and,
a flange forming an output for the torsional vibration damper and including;
an inner circumference arranged to transmit torque from the torsion vibration damper; and,
at least one radially outwardly extending protrusion engaged with the second end for the at least one arc spring.

9. A torsional vibration damper, comprising:
an input component;
a guide shell;
at least one spring with:
a central space formed by coils for the at least one spring;
a first end engaged with the input component and in contact with the guide shell; and,
a second end wholly separated from the guide shell in a radial direction; and,
a flange with;
at least one radially outwardly extending protrusion; and,
at least one protrusion extending circumferentially from the at least one radially outwardly extending protrusion and engaged with the second end.

* * * * *